United States Patent Office 3,591,536
Patented July 6, 1971

3,591,536
POLYPROPYLENE OR POLY-4-METHYL-PENTENE-1 FIBERS WITH CELLULOSE DERIVATIVES AND A PROCESS FOR PRODUCING THE SAME
Noboru Fukuma, Kenichi Matsui, and Chiyouzi Nakai, Nobeoka-shi, Yoshisato Fujisaki, Tokyo, Atsuo Nakanishi, Yokohama, and Tsukasa Shima, Nobeoka-shi, Japan, assignors to Asahi Kasei Kogyo Kabushiki Kaisha, Osaka, Japan
No Drawing. Filed June 8, 1967, Ser. No. 644,500
Claims priority, application Japan, June 11, 1966, 41/37,315; June 15, 1966, 41/38,244; Jan. 19, 1967, 42/3,349
Int. Cl. D01f 7/02
U.S. Cl. 260—17   6 Claims

ABSTRACT OF THE DISCLOSURE

Polypropylene or poly-4-methylpentene-1 fibers, useful in clothing and as interior materials which consist of a composition obtained by mixing:
(A) crystalline polypropylene or crystalline poly-4-methylpentene-1 with
(B) a polymer of at least one member selected from the group consisting of cellulose derivatives, polyester polymers and polyvinyl polymers having a melting point or softening point of less than 200° C. and
(C) a substance of at least one member selected from the group consisting of liquid paraffin, polyalkylene oxide and phthalic acid ester.

The substances are added in amounts of 5–15% (B) and 5–20% (C) by weight respectively, based on the total weight of the composition $(A)+(B)+(C)$.

---

The present invention relates to polypropylene fibers and poly-4-methylpentene-1 fibers which are excellent in dyeability, and to a process for producing the same.

Notwithstanding that polyolefins such as crystalline polypropylene and crystalline poly-4-methylpentene-1 possess a number of advantages from the viewpoint of physical properties, there is a large drawback that shaped articles thereof are extremely difficult to dye in deep shades with high color fastnesses by ordinary dyeing methods due to the fact that such polyolefins do not have a polar group in the molecule which is able to become a dye site.

In order to improve the dyeability of such difficult dyeable polyolefins as above, there have been proposed many methods by which a polar high molecular weight compound is added to polyolefin resin before shaping. These attempts, however, do not sufficiently accomplish their objects due to the fact that despite the achieving of sufficient dyeing when such polar high molecular compound is dyed alone, when it is contained in the polyolefin resin, the dyeability thereof is markedly reduced, because it is thermally decomposed at the time of heat shaping, or the physical properties of the shaped article obtained by addition thereof are deteriorated.

In dyeing a shaped article obtained by melt-mixing cellulose derivatives, polyester polymers, polyvinyl polymers with polyolefin resins, these added polymers can serve as dye sites. However, such a mixture containing only 5–15% by weight of any of these polymers cannot be formed to obtain fibers, having a monofilament size of less than 5 denier because of its poor dispersion property. Therefore, such mixture cannot be used for industrial spinning. Moreover, even if the spinning is conducted with the utmost care, as in a laboratory experiment, the tenacity of the drawn fibers obtained is insufficient and at the same time stretched fibers cannot be dyed in fresh and deep shades. There have heretofore been proposed several attempts to solve the above drawbacks, which comprise employing various kinds of surface active agents or improving the dispersion property of the polymers added to the polyolefin resin by copolymerizing the polyester polymers or polyvinyl polymers. These attempts, however, have not solved these drawbacks from an industrial point of view because they still leave two outstanding defects, one being that even though the spinning can barely be conducted, there is incurred cuts in the fibers or uneven draw in the subsequent drawing step, and moreover the dyeability of the fibers is reduced to an extreme extent in proportion to an increase in the draw ratio with a view to increase tenacity of the fibers, and therefore the fibers can scarcely be dyed when approaching the maximum draw ratio. The second defect is that in the steps of kneading and shaping thereof, cellulose derivatives, polyester polymers or polyvinyl polymers are found to have undesirable coloring when subjected to thermal decomposition.

Under the above circumstances, extensive studies by the present inventors for many years have resulted in the completion of the present invention. That is, it is an object of the present invention to provide polypropylene fibers or poly-4-methylpentene-1 fibers consisting of a composition obtained by mixing crystalline polypropylene or crystalline poly-4-methylpentene-1 (A) with a polymer (B) of one or more members selected from the group consisting of cellulose derivatives, polyester polymers and polyvinyl polymers having a melting point or softening point of less than 200° C., and a substance (C) of one or more members selected from the group consisting of liquid paraffin, polyalkylene oxide and phthalic acid ester in amounts of 5–15% (B) and 5–20% (C) by weight based on the comopsition $(A+B+C)$. A further object of the present invention is to provide a process for producing polypropylene fibers or poly-4-methylpentene-1 fibers excellent in dyeability, characterized in that crystalline polypropylene or crystalline poly-4-methylpentene-1 (A) is admixed with a polymer (B) of one or more members selected from the group consisting of cellulose derivatives, polyester polymers, polyvinyl polymers having a melting point or softening point of less than 200° C., and a substance (C) of one or more members selected from the group consisting of liquid paraffin, polyalkylene oxide and phthalic acid ester in amounts of 5–15% (B) and 5–20% (C) by weight respectively based on the composition $(A+B+C)$ and the resultant composition is spun by melt-spinning method.

The fibers according to the present invention contain the substance (C) in an amount of 5–20% by weight. It is a striking fact that in spite of the amount of such substance the fibers still have the required properties. Methods for spinning crystalline polypropylene by dissolving it in a solvent such as kerosene have been known as reported in Japanese patent publication Nos. 8460/58 and 8461/58. These methods, however, are wet spinning or dry spinning methods, wherein the solvents are removed therefrom after completion of spinning, and are quite different from the process of the present invention. As mentioned above, despite of a large amount of liquid contained in the fibers of the present invention, no problem is encountered in the handling thereof under normal conditions. For instance, substance (C) is not substantially bled out therefrom even when the fibers are subjected to steam or dry heat treatment at 120° C. On the contrary, drawability thereof is rather improved and moreover, it is a surprising fact that fiber dyeability is not substantially reduced even when the fibers are drawn to the maximum draw ratio, whereby they can be dyed in fresh and deep shades. Thus, the foregoing first defect is completely solved by the present invention.

The melt-flowing characteristic of the polyolefin resin vary on account of the addition of (C) in an amount of substance 5-20% by weight based on the composition. This variation is subject to change depending on the kind of polyolefin employed. For instance, a mixing amount of liquid paraffin necessary for exhibiting a special effect in the present invention is preferably 5-15% by weight for crystalline polypropylene and 5-20% by weight for crystalline poly-4-methylpentene-1. And, the optimum mixing amount thereof varies depending on the polymerization degree of said polyolefin resin employed as well. For instance, in the case of crystalline polypropylene, the preferred mixing amount thereof is 5-10% by weight for those having an intrinsic viscosity of less than 4.5-1.5 as measured at 135° C. using Tetralin as a solvent, and 5-15% by weight for those having an intrinsic viscosity of 1.5-2.0. Thus, it is possible to reduce considerably the spinning temperature of said polyolefin by admixing liquid paraffin therewith. For instance, in the case of crystalline polypropylene, the melt-spinning can be conducted even at about 170° C. Furthermore, in the case of crystalline poly-4-methylpentene-1, a spinning temperature for spinning the same alone must be 300° C. or above because the melting point thereof is 240° C. Despite the above, according to the process of the present invention, the melt-spinning can be effected at about 250° C., and moreover the spinnability of the polyolefin is far better than in the case of spinning the same without addition of liquid paraffin. Accordingly, a composition obtained by admixing said polyolefin with polymer (B) of cellulose derivatives, polyester polymers or polyvinyl polymers has heretofore been kneaded and spun at high temperatures, and polymer (B) has been subjected to thermal change whereby the obtained shaped article was colored. However, the foregoing second defect has thus been overcome by the present invention as well.

In the above case, when the mixing amount of substance (C) is less than 5% by weight, not only are fibers of fine denier difficult to obtain, but also a reduction in the dyeability of the fibers is observed in proportion to an increase in the drawing ratio, and therefore the mixing amount of (C) must be 5% by weight or more. When the mixing amount of (C) exceeds 20% by weight, besides the fact that dyeability has already reached the point of saturation, the melt viscosity of said mixed resin becomes too low and causes difficulty in fine dispersion of (B) by kneading in some cases and moreover the fibers thereby obtained may have unfavorable properties because substance (C) is bled therefrom.

Now, each of polymers (B) which are to be added together with such an amount of substance (C) must be such that as to have a melting point or softening point of less than 200° C., and only when this condition is satisfied, will the foregoing first defect be completely dissolved. That is, when a melting point or softening point of polymer (B) exceeds 200° C., even in coexistence with (C), said polyolefin resin is difficult to wind up as fibers of fine denier, and moreover the fibers thus obtained cannot be drawn to an extent where sufficient tenacity can be obtained. In addition thereto, the dyeability of the fibers is insufficient. Needless to say, even when a melting point or softening point of polymer (B) is less than 200° C., the foregoing spinnability and dyeability cannot simultaneously be satisfied unless 5-20% by weight of substance (C) is in coexistence therewith.

The cellulose derivatives used in the present invention preferably have a melting point or softening point of less than 200° C. If the above condition is satisfied, the fiber dyeability does not decrease even if the drawing ratio is increased, and at the same time the fiber thereby obtained has excellent mechanical properties. That is, when a melting point or softening point of the cellulose derivatives exceeds 200° C., said polyolefin resin is difficult to wind up as fibers of fine denier even if a liquid of one or more members selected from the group consisting of liquid paraffin, polyalkylene oxide, and phthalic acid ester are made to coexist therewith. Moreover, the fiber thereby obtained cannot be stretched to an extent where sufficient tenacity can be attained and also dyeability thereof is insufficient. It goes without saying that even when a melting point or softening point of cellulose derivatives is less than 200° C., the foregoing spinnability and dyeability cannot be simultaneously satisfied unless a mixture of one or more of liquid paraffin, polyalkylene oxide, and phthalic acid ester in an amount of 5-20% by weight are made to coexist therewith.

In achieving the objects of the present invention, the preferred mixing amount of cellulose derivatives is in the range of 5 to 15% by weight. When said mixing amount is less than 5%, a sufficient concentration of dyed color shade cannot be attained. When it exceeds 15% by weight, not only is an increase of concentration of dye color not obtained, but also a loss in mechanical properties of the fibers is produced.

Examples of cellulose derivatives having a melting point or softening point of less than 200° C. useable in the present invention include alkyl-substituted cellulose ethers such as ethyl cellulose, propyl cellulose, amyl cellulose and ethyl butyl cellulose, benzyl cellulose fatty acid - substituted cellulose esters such as benzyl cellulose, cellulose propionate, cellulose acetate propionate, cellulose butyrate and cellulose acetate butyrate, and alkyl fatty acid substituted cellulose ether esters such as ethyl cellulose acetate, ethyl cellulose propionate and ethyl cellulose acetate butyrate. In order to give these cellulose derivatives the preferred melting points or softening points, it is preferable to previously add a suitable plasticizer thereto so as to adapt the cellulose derivative to deformation at the time of melt-spinning as well as to lower the melting point or softening points including of course adjustment of degree of substitution and change of polymerization degree. The amount of plasticizer to be previously added to the cellulose derivative is preferably 0-2.0 parts based on 10 parts of the cellulose derivative. Even when the amount exceeds 2.0 parts, no conspicuous changes in deformation in the melt-spinning and in draw ratio in the drawing step is obtained. Furthermore, in the present specification, the thus plasticized cellulose derivative, i.e. plasticized products of cellulose derivatives are all included in the category of the cellulose derivatives.

There may be also added a heat stabilizer, an antioxidant, and a color stabilizer to the above-mentioned cellulose derivatives.

The constituents of polyester polymers used in the present invention include the following.

(1) Dibasic acid or functional derivatives thereof: In this category, are aromatic, aliphatic and other types. For instance, there may be mentioned those having an aromatic ring, such as, terephthalic acid, phthalic acid, naphthalene dicarboxylic acid, diphenyl dicarboxylic acid, diphenylether dicarboxylic acid and diphenylmethane dicarboxylic acid; aliphatic dicarboxylic acid such as oxalic acids, succinic acid, adipic acid, azelaic acid and sebacic acid; and alicyclic dicarboxylic acids such as hexahydroterephthalic acid and hexahydrophthalic acid or their lower alkylesters or glycolesters.

(2) Hydroxycarboxylic acid or functional derivatives thereof: Aliphatic hydroxycarboxylic acids such as ω-hydroxypalmitic acid and butyrolactone or lactone thereof, alicyclic hydroxycarboxylic acids such as 4-(β-hydroxyethoxy)-cyclohexane carboxylic acid, aromatic hydroxycarboxylic acids such as 4-(β-hydroxyethoxy)-benzoic acid and 4-hydroxymethyl benzoic acid or lower alkylesters thereof.

(3) Dihydroxy compounds: Aliphatic glycols such as ethylene glycol, 1,10-decanidol and neopentyl glycol, aromatic dihydroxy compounds such as hydroquinone, and dihydroxynaphthalene, and alicyclic compounds such as cyclohexane dimethanol.

The above-mentioned constituents may have a suitable substituent such as an alkyl group and halogen in such a ring, for instance, as an aromatic nucleus. Furthermore, one of these constituents may be, for instance, such high molecular weight compounds as polyethylene glycol or poly-4-ethoxybenzoate.

The polyester polymers used in the present invention are polyester polymers having a melting point or softening point of less than 200° C. and can be obtained by polycondensing dibasic acid, hydroxycarboxylic acids or functional derivatives thereof illustrated in the foregoing paragraphs (1) and (2) with dihydroxy compounds illustrated in paragraph (3), or poly-condensing hydroxycarboxylic acids or functional derivatives thereof. Furthermore, when the respective constituents of the foregoing paragraphs (1), (2) and (3) are mixtures of two or more kinds of constituents respectively, these mixtures are included in the scope of the present invention. Typical examples of such polyester polymers may be as follows: (the figures in square brackets represent the melting point C.°).

Polyethylene carbonate [39], polyethylene succinate [95], polyethylene subacate [75], polyethylene diglycolate [17], polyethylene isophthalate [102], polyhexamethylene terephthalate [150], polycaprolactone [50] and the like.

Still further, the polyvinyl polymers used in the present invention are homopolymers or copolymers, whose constituents are monomers having vinyl unsaturated bonds. Examples of these polyvinyl polymers are as follows: (the numbers on square brackets are the melting points or softening points thereof, but these values may vary depending upon the method of production of the polymers).

Vinyl polymers such as polystyrene [90], polyvinyl acetate [26], polyacrylic acid [80], polymethylmethacrylate [125], polyvinyl formal [110], polyvinyl butyral [100], polyvinyl carbazol [100], polyvinyl chloride [65], polymethyl vinylketone [40], polymethyl vinylether [Liq.], styrene/acrylonitrile copolymerized product [90], styrene/methylmethacrylate copolymerized product [95], α-methylstyrene/methylmethacrylate copolymerized product [120], acrylonitrile/butadiene copolymerized product [93], acrylonitrile/isopropenyltoluene copolymerized product [110], acrylonitrile/vinylidene chloride copolymerized product [150], vinyl chloride/vinyl acetate copolymerized product [65], ethylene/ethyl acetate copolymerized product [60], ethylene/vinyl acetate copolymerized product [90], ethylene/carbon monoxide copolymerized product [120], and the like, each having a melting or softening point of less than 200° C.

The liquid paraffin used in the present invention is a colorless liquid obtained from petroleum, which is a substantially odorless and chemically inert substance on heating. The liquid paraffin is insoluble in water and alcohol, but is soluble in ether, chloroform and carbon bisulfide. And, because of very high compatibility of liquid paraffin with polyolefin resin, bleeding of the liquid paraffin from the fibers can substantially be neglected as previously stated before. However, if necessary, the liquid paraffin can also be extracted and removed from the fibers by treating said fibers in the presence of ether, chloroform or carbon bisulfide. In this case, the mechanical properties of the fibers are not deteriorated because ether, chloroform or carbon bisulfide does not substantially change polyolefin, polyester and vinyl polymers.

The polyalkylene oxide used in the present invention includes polyethylene oxide and polypropylene oxide. The properties of these oxides are subject to various changes depending on the degree of polymerization thereof. Polyethylene oxide and polypropylene oxide used in the present invention are not limited according to the polymerization degree thereof, as those commercially available with any degree of polymerization can be used as such. For instance, despite the extreme difference in solubility in water between polyethylene oxides having polymerization degrees of 400 and 4,000, respectively, polyolefin resins in which 10% by weight of the aforesaid polyethylene oxides, respectively, change in the same way the melt-flowing characteristics of said polyolefin resin. In the case of crystalline polypropylene, melt-spinning can be made possible at even about 180° C. Furthermore, notwithstanding that polyethylene oxide having a polymerization degree of 400 is soluble in water, when it coexists with a cellulose derivative, it does not have an adverse influence upon the shaping properties thereof even when it is subjected to hot steam or dry heat treatment at 120° C., or in the dyeing process while it will not substantially bleed out therefrom.

The phthalic acid esters used in the present invention includes such phthalic acid dialkyl esters as dimethyl phthalate, diethyl phthalate, dibutyl phthalate and dioctyl phthalate. These esters can change the melt-flowing characteristics of the polyolefin resin in the same way as the liquid paraffin and polyalkylene oxide. For instance, crystalline polypropylene into which 20% of diethylphthalate is incorporated can be melt-spun even at about 170° C., and crystalline poly-4-methylpentene-1 into which 20% of diethylphthalate is incorporated can be melt-spun even at about 250° C. As mentioned above, it is preferable to use the cellulose derivative together with a plasticizer so that it can withstand deformation at the time of melt-spinning. Since phthalic acid esters can be a plasticizer, it is of advantage that prior addition of a plasticizer the cellulose derivative is not necessary.

As above, with the use of liquid paraffin, polyalkylene oxide or phthalic acid ester it is possible to change the melt-flowing characteritics of the polyolefin fibers and to effect the mix and shape at a low temperature. Furthermore, when liquid paraffin, polyalkylene oxide, and phthalic acid ester are used either singly or in mixture thereof in a total amount of 5–20% by weight, no adverse effect will be obtained. Accordingly, a composition obtained by incorporating a cellulose derivative into the polyolefin has heretofore frequently suffered from cuts in fibers during melt-spinning and from deterioration in physical properties of the fibers, thereby obtained, or from undesirable coloration of said fibers due to thermal change of cellulose derivative because of the high kneading and spinning temperatures thereof. However, mixing and shaping at a low temperature have thus become possible by the present invention.

The process of the present invention will not affect the use of various stabilizers for high molecular weight substances, fluorescent whitening agents or fillers for example, titanium dioxide at the same time.

In the process of the present invention, when kneading the three components before spinning, i.e., (A) the polyolefin resin, (B) polymers of one or more members selected from the groups selected of cellulose derivatives, polyester polymers and vinyl polymers, and (C) a substance of one or more members selected from the group consisting of liquid paraffin, polyalkylene oxide and phthalic acid ester, (A), (B) and (C) may simultaneously be mixed together, but it is also possible to vigorously knead a mixture at (A) and (C) at a temperature as low as possible, and then mix (B) therewith. When a vigorous kneading is conducted, (B) can be finely dispersed even if the temperature thereby attained is less than the melting point of (B). Accordingly, it is preferable to use a strong mixing apparatus such a Banbury mixer, and it is most preferred that the entire resin mixture for spinning be prepared by use of such mixers. However, when a master batch is prepared containing materials having concentrations as high as possible, a sufficiently satisfactory resin for spinning can be obtained which is stable and subsequent dilution thereof can be effected by a screw type extruder.

Dyes for dyeing the fibers according to the present invention are not particularly limited. However, disperse dyes, azoic dyes, mordant dyes and the like are preferably used.

The present invention is further illustrated in detail in the following examples.

the original length by a draw twister of ordinary type at a velocity of 400 m./min. The drawn temperature employed in this case was 50° C. The drawn fibers were colorless and transparent, and had a tenacity of 4.5 g./denier and an elongation of 35%.

20 g. of the thus obtained fibers were dyed in a dye bath of 1 l. containing 0.6 g. of C.I. Disperse Blue 6, 62050, at 100° C. for 1 hour to give very clear deep blue fibers. In this dyeing step, the liquid paraffin contained in the fibers did not elute in the dyebath. Furthermore, the feel of the thus dyed fibers was similar to that of ordinary pure polypropylene fibers and did not become sticky at all.

EXAMPLE 6

Eighty parts of crystalline poly-4-methylpentene-1 having an intrinsic viscosity of 2.0 as measured at 135° C. using Tetralin as a solvent, 8 parts of ethylene/vinyl acetate copolymer (vinyl acetate content being 40% by weight) having a softening temperature (Vicut method) of 59° C., and 12 parts of liquid paraffin were mixed together. The mixture was kneaded in a Banbury mixer, wherein the temperature of the resin being kneaded was adjusted so as not to exceed 250° C. The kneaded and mixed resin was cut into pellets. The same procedures as in Example 1 were repeated except for the following conditions.

The maximum temperature of molten resin within the spinning machine: 260° C.
Temperature of molten resin just before the spinneret: 260° C.
Drawing temperature: 110° C.
Drawing and winding speed: 150 m./min.

Mechanical properties of the stretched fibers obtained were 4.5 g./denier in tenacity and 30% in elongation. The stretched fibers were dyed with fresh and deep shades in the same way as in the case of Example 1.

What is claimed is:
1. Polypropylene or poly-4-methylpentene-1 fibers consisting of a composition obtained by mixing (A) crystalline polypropylene or crystalline poly-4-methylpentene-1 with (B) a polymer of at least one cellulose derivative selected from the group consisting of alkyl substituted cellulose ethers, fatty acid substitued cellulose esters and alkyl fatty acid substituted cellulose ether esters having a melting point or softening point of less than 200° C., and (C) a substance which is at least one member selected from the group consisting of liquid paraffin, polyalkylene oxide and phthalic acid dialkyl ester in amounts of 5–15% (B) and 5–20% (C) by weight respectively based on the composition $(A+B+C)$ and melt spinning the mixture at a temperature of about 150° C. to 260° C.

2. The fibers as claimed in claim 1, wherein the polyalkylene oxide is polyethylene oxide, polypropylene oxide or mixtures thereof.

3. The fibers as claimed in claim 1 wherein the alkyl substituted cellulose ether is selected from the group consisting of ethyl cellulose, propyl cellulose, amyl cellulose, ethylbutyl cellulose and benzyl celluose; the fatty acid substituted cellulose ester is selected from the group consisting of benzyl cellulose, cellulose propionate, cellulose acetate propionate, cellulose butyrate and cellulose acetate butyrate; the alkyl fatty acid substituted cellulose ether ester is selected from the group consisting of ethyl cellulose acetate, ethyl cellulose propionate and ethyl cellulose acetate butyrate.

4. A process for producing polypropylene fibers or poly-4-methyl-pentene-1 fibers, said process comprising admixing (A) crystalline polypropylene or crystalline poly-4-methylpentene-1 with (B) a polymer of at least one cellulose derivative selected form the group consisting of alkyl substituted cellulose ethers, fatty acid substituted cellulose esters and alkyl fatty acid substituted cellulose ether esters having a melting point or softening point of less than 200° C., and (C) a substance which is at least one member selected from the group consisting of liquid paraffin, polyalkylene oxide and phthalic acid dialkyl ester in amounts of 5–15% (B) and 5–20% (C) by weight respectively based on the composition $(A+B+C)$ and melt spinning the resulting composition at a temperature of about 150° C. to 260° C.

5. A process as claimed in claim 4, wherein the polyalkylene oxide is polyethylene oxide, polypropylene oxide or mixtures thereof.

6. A process as claimed in claim 4 wherein the alkyl substituted cellulose ether is selected from the group consisting of ethyl cellulose, propyl cellulose, amyl cellulose, ethylbutyl cellulose and benzyl cellulose; the fatty acid substituted cellulose ester is selected from the group consisting of benzyl cellulose, cellulose propionate, cellulose acetate propionate, cellulose butyrate and cellulose acetate butyrate; the alkyl fatty acid substituted cellulose ether ester is selected from the group consisting of ethyl cellulose acetate, ethyl cellulose propionate and ethyl cellulose acetate butyrate.

References Cited

UNITED STATES PATENTS

| 3,051,670 | 8/1962 | Grantham | 260—17 |
| 3,153,680 | 10/1964 | Giustiniani et al. | 260—874 |
| 3,303,148 | 2/1967 | Joyner et al. | 260—17 |
| 3,322,704 | 5/1967 | Berger et al. | 260—28.5AX |
| 3,359,344 | 12/1967 | Fukushima | 260—857 |
| 3,364,281 | 1/1968 | Saito et al. | 260—873 |
| 3,029,215 | 4/1962 | Campbell | 260—33.6PO |
| 3,381,058 | 4/1968 | Caldwell et al. | 260—860 |
| 2,700,657 | 1/1955 | Look et al. | 260—898 |
| 3,201,364 | 8/1965 | Salyer | 260—33.6 |
| 3,404,104 | 10/1968 | Hill et al. | 260—2.5 |

FOREIGN PATENTS

| 4,062,210 | 11/1965 | Japan | 264—Digest |

OTHER REFERENCES

Buttrey, Plasticizers, 1957 (2nd Ed.) Cleaver-Hume Press, Ltd., London pp. 5–7, 9 and 11–15.

WILLIAM H. SHORT, Primary Examiner

L. M. PHYNES, Assistant Examiner

U.S. Cl. X.R.

260—31.8, 33.2, 33.6